United States Patent [19]

Kennard

[11] 4,135,915
[45] Jan. 23, 1979

[54] KINETIC ENERGY MONITOR

[75] Inventor: John M. Kennard, Orpington, England

[73] Assignee: GEC Mechanical Handling Limited, Melksham, England

[21] Appl. No.: 721,477

[22] Filed: Sep. 8, 1976

Related U.S. Application Data

[63] Continuation-in-part of Ser. No. 529,297, Dec. 4, 1974, abandoned.

[30] Foreign Application Priority Data

Dec. 12, 1973 [GB] United Kingdom ............... 57567/73

[51] Int. Cl.² ........................................... C21C 5/30
[52] U.S. Cl. ............................................... 75/60
[58] Field of Search ...................................... 75/60

[56] References Cited

U.S. PATENT DOCUMENTS

| | | | |
|---|---|---|---|
| 3,708,159 | 1/1973 | DeBray | 75/60 |
| 3,773,497 | 11/1973 | Grenfell | 75/60 |
| 3,832,159 | 8/1974 | Hoffken | 75/60 |

Primary Examiner—P. D. Rosenberg
Attorney, Agent, or Firm—Kirschstein, Kirschstein, Ottinger & Cobrin

[57] ABSTRACT

Apparatus for physically or chemically treating a substance in a vessel under conditions which make it difficult to ascertain physical and/or chemical changes, comprising means for monitoring the weight of the substance in the vessel and producing a signal indicative of the apparent variations in weight of the substance, which signal includes, as a factor, a variation in weight due to agitation of the substance in the vessel as it undergoes a physical and/or a chemical change, means for extracting and recording that part of the electrical signal produced by the agitation of the substance as a function of time, whereby the treatment of the substance may be altered in accordance with the signal produced by the agitation. When the substance is a molten charge in a steel making process involving the injection of oxygen, the part of the signal produced by the agitation of the molten charge is a frequency band within the range 0.05Hz to 0.5 Hz.

28 Claims, 5 Drawing Figures

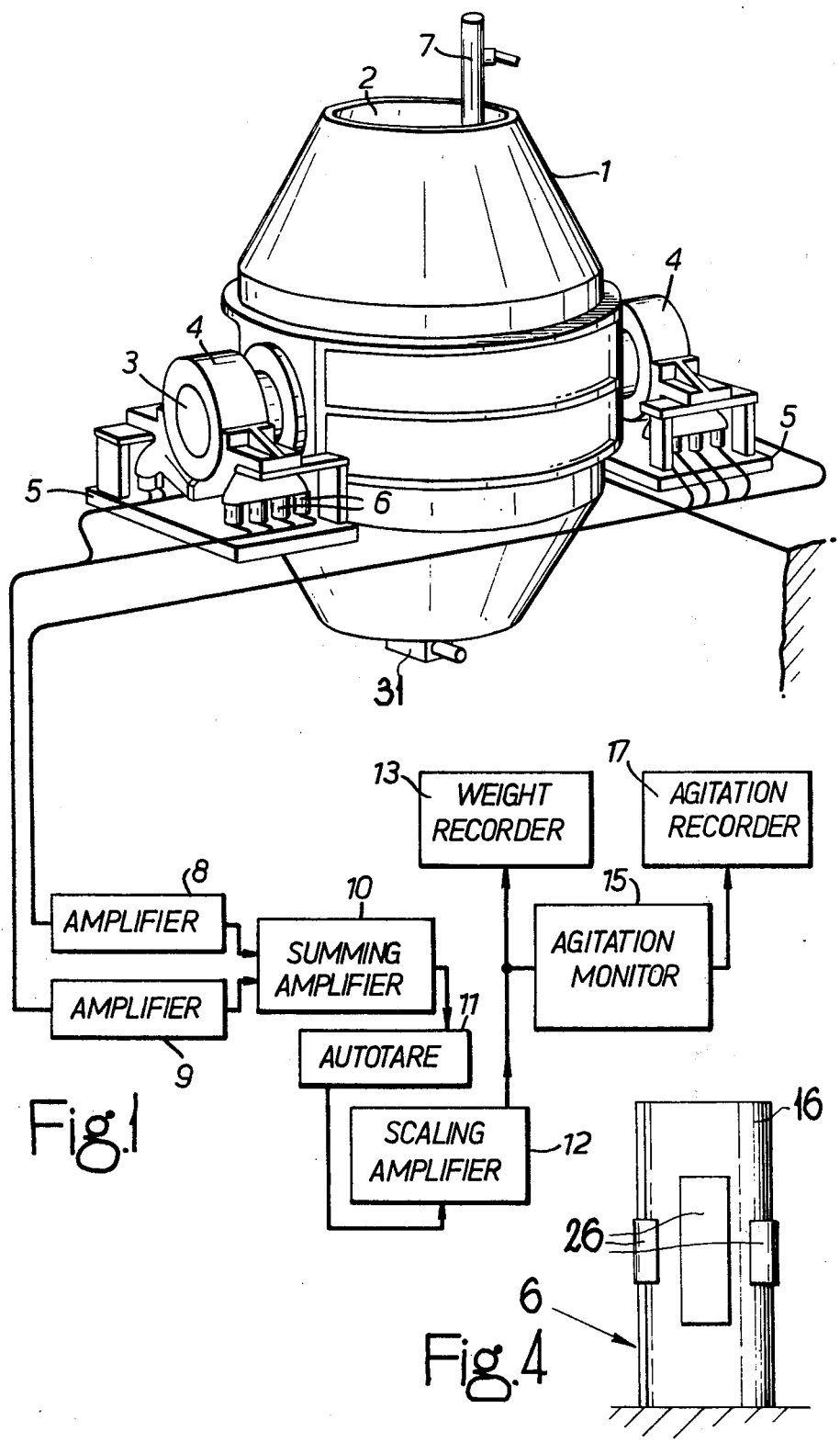

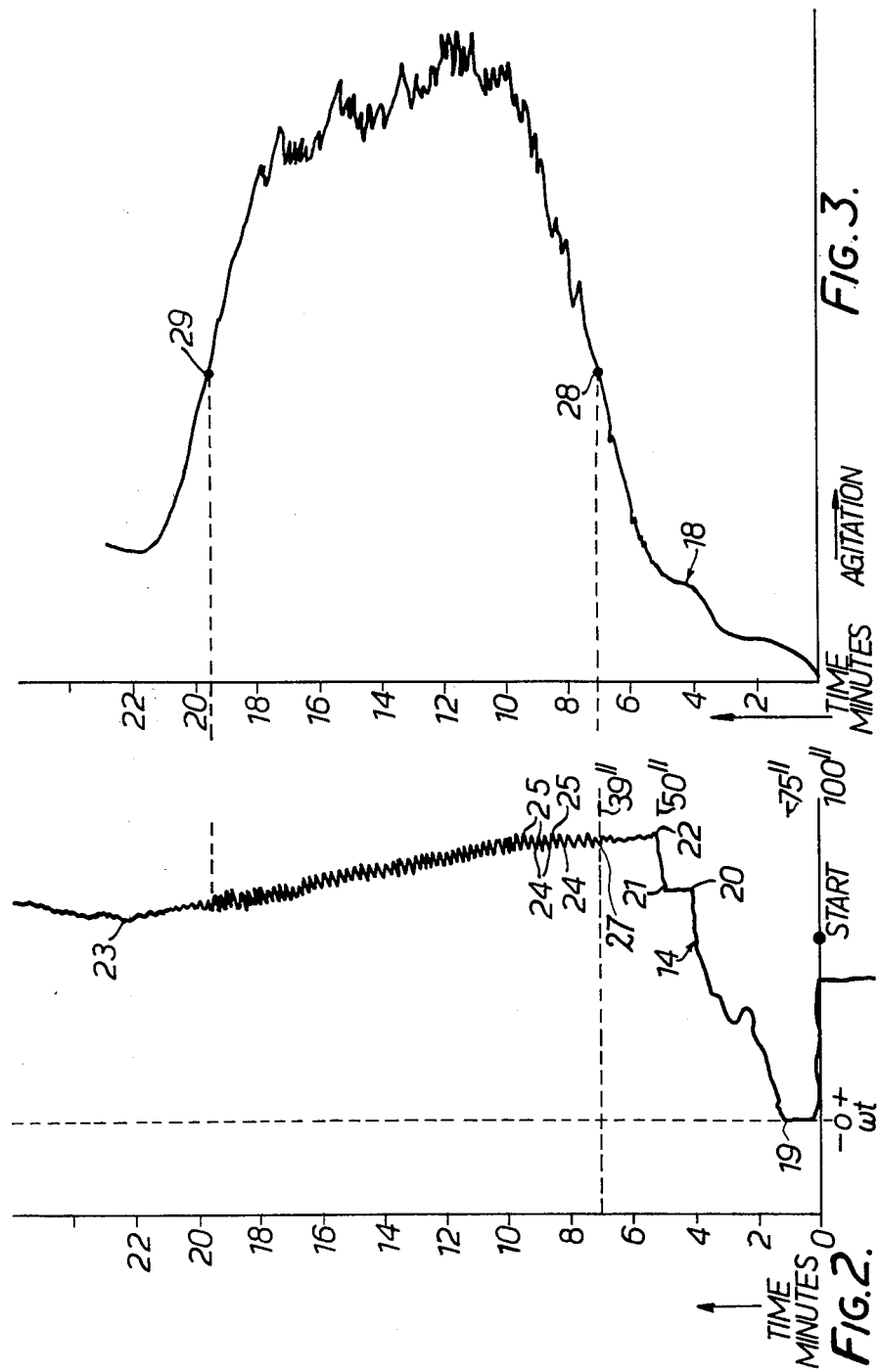

KINETIC ENERGY MONITOR

This application is a continuation-in-part of Ser. No. 529,297, filed Dec. 4, 1974, and now abandoned.

This invention relates to a method of, and apparatus for controlling the treatment of a substance in a vessel under conditions such that it is difficult to directly measure a physical and/or a chemical change that is taking place in the substance, and has an important application to the treatment of a molten charge in a steelmaking process involving the injection of oxygen.

In a wide variety of industrial processes in which a substance is treated in a vessel, and ranging, for example, from steelmaking to brewing and winemaking, the control of the process to bring it to a satisfactory conclusion depends on the physical and/or chemical changes which take place in the substance with the elapse of time. It is a disadvantage of many such processes that the environment, such as the high temperature in steelmaking, or the need to avoid contaminating the substance, as in brewing or winemaking, make it difficult to ascertain the physical and/or chemical changes which are taking place in the substance, and therefore the control of the process and in particular choice of the optimum time for its onset and termination, presents considerable difficulty.

It is an object of this invention to provide a process and apparatus which mitigates the above-mentioned difficulty.

According to one aspect of the present invention apparatus for physically or chemically or physically and chemically variably treating a substance in a vessel under conditions that make it difficult to ascertain a physical change or a chemical change or physical and chemical changes, during which variable treatment the weight of the substance varies as a function of time and at least during a stage of such treatment the substance undergoes a period of change in agitation accompanying a change in at least a physical condition or a chemical condition or physical and chemical conditions of the substance, the onset and termination of said period of changed agitation being indicative of the beginning and the end of said stage of the treatment, said treatment desirably being altered at the beginning and at the end of said stage, comprises means for monitoring the weight of the substance in the vessel during treatment as a function of time, means for producing an electrical signal indicative of the apparent variation in weight of the substance in the vessel which signal includes, as a factor, a variation in weight due to the agitation of the substance in the vessel as it undergoes a physical change or a chemical change or physical and chemical changes, means for extracting from the apparent weight electrical signal that part of the signal produced by the agitation of the substance in the vessel, and means for recording the agitation part of the signal as a function of time, whereby said treatment of said substance may be altered at the beginning and end of said stage at the onset and at the termination of said period of change in agitation.

According to another aspect of the invention a method for physically or chemically or physically and chemically variably treating a substance in a vessel during which variable treatment the weight of the substance varies as a function of time and at at least during a stage of such treatment the substance undergoes a period of change in agitation accompanying a change in at least a physical condition or a chemical condition or physical and chemical conditions of the substance, the onset and termination of said period of changed agitation being indicative of the beginning and the end of said stage of the treatment, said treatment desirably being altered at the beginning and at the end of said stage, comprises monitoring the weight of the substance in the vessel during treatment as a function of time, producing an electrical signal indicative of the apparent variation in weight of the substance in the vessel which signal includes, as a factor, a variation in weight due to the agitation of the substance in the vessel as it undergoes a physical change or a chemical change or physical and chemical changes, extracting from the apparent weight electrical signal that part of the signal produced by the agitation of the substance in the vessel, recording the agitation part of the signal as a function of time, and altering said treatment of said substance at the beginning and end of said stage at the onset and at the termination of said period of change in agitation.

The part of the signal produced by agitation of the substance in the vessel may be a frequency band within the range 0.05 Hz to 5.0 Hz. When the substance whose treatment is to be controlled is the molten charge in a steelmaking process involving the injection of oxygen, a preferred part of the signal produced by the agitation of the molten charge may be a frequency band within the range 0.1 Hz to 1.0 Hz.

Preferably the weight of the substance in the vessel is monitored by a plurality of force measuring transducers which may be incorporated in pedestals supporting the vessel.

Each force measuring transducer may comprise a steel billet to which is bonded a foil strain gauge sensitive to tensile or compressive load, and the foil strain gauges may be connected in an electrical bridge circuit arranged to produce the electrical signal indicative of the apparent variations in weight of the substance in the vessel.

The invention will now be described, by way of example, with reference to the accompanying drawings in which:

FIG. 1 is a schematic perspective view of a steelmaking furnace embodying the invention;

FIG. 2 is a typical weight change record made during a refining process of oxygen steelmaking carried out in the furnace shown in FIG. 1;

FIG. 3 is a typical level of agitation record corresponding to the weight change record shown in FIG. 2;

FIG. 4 is a side elevation of a force measuring transducer shown in FIG. 1; and

Figure 5:
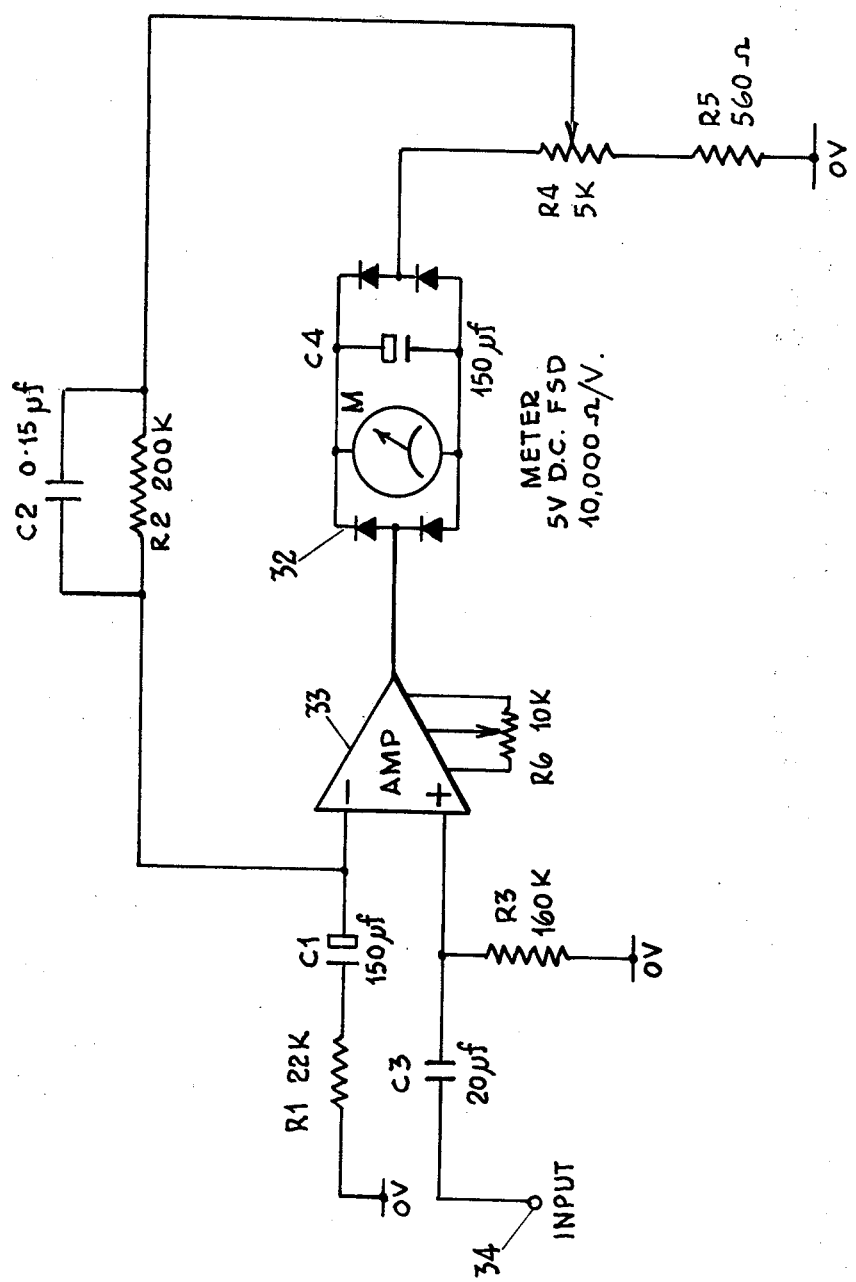
FIG. 5 is a schematic circuit diagram of an agitation monitor shown in block form in FIG. 1.

Referring to the drawings, the furnace comprises a refractory vessel 1 having an opening 2 at the top through which scrap iron or scrap steel may be received, and through which molten metal from the blast furnace may be added to the scrap metal. The vessel 1 is provided with two trunnions 3 each of which is supported in a trunnion bearing 4 to permit the vessel 1 to be tilted to discharge the molten metal. Each trunnion bearing 4 is supported on a pedestal 5 incorporating eight force measuring transducers 6 arranged to monitor the weight of the vessel 1. As shown in FIG. 4, each force measuring transducer 6 comprises a steel billet 16 to which is intimately bonded a plurality of foil strain gauges 26 sensitive to tensile or compressive load induced by the weight of the vessel 1. A lance 7 extending through the opening 2 at the top of the vessel is arranged to inject oxygen into the molten charge.

The strain gauges 26 of the transducers 6 are connected together to form a Wheatstone Bridge circuit to which an energising voltage is applied by two amplifiers 8 and 9. When a load is applied to the transducers 6 a millivolt output signal directly proportional to the applied load is produced by the Wheatstone Bridge and is passed to the amplifiers 8 and 9. Output signals produced by the amplifiers 8 and 9 are summated in a summing amplifier 10, the output of which is applied to an autotare or automatic zero unit 11 having a 0 to 5 volt d.c. output signal which represents a weight of 0 to 200 tons. The output of the autotare unit 11 is passed to a differential scaling amplifier 12 having a 0 to ± 5 volt d.c. output which represents a weight of 0 to ± 30 tons. The d.c. output signal from the scaling amplifier 12, which is indicative of the apparent variations in weight of the contents of the vessel 1, is applied to a weight recorder 13 which produces a change of weight trace 14 as shown in FIG. 2.

The d.c. output signal from the scaling amplifier 12 is also applied to an agitation monitor 15 which is responsive to that part of the d.c. output signal produced by the agitation of the contents of the vessel 1 and which for molten steel and slag in the vessel 1 has been found to be a frequency band within the range 0.05 Hz to 5.0 Hz. As shown in FIG. 5 the agitation monitor 15 comprises a D.C. moving coil meter M driven from a bridge rectifier 32 and filtered by a capacitor C4. The bridge rectifier is connected in the feed back loop of an operational amplifier 33 to provide the bridge rectifier 32 with a constant current source. The sensitivity of the circuit is set by resistors R1, R2, R4 and R5, fine control being provided by the resistor R4.

The frequency response of the agitation monitor 15 is determined by the resistor/capacitor combinations R1/C1 and R3/C3 which form a second order high-pass filter giving a − 3 dB pole at a frequency 0.05 Hz and by resistor/capacitor combination R2/C2 which forms a low-pass filter giving a − 3 dB pole at a frequency of 5 Hz. The overall resistor/capacitor network formed by these resistor/capacitor combinations provide a band pass filter having a frequency range from 0.05 Hz to 5.0 Hz. The d.c. output signal from the scaling amplifier is applied to an input terminal 34 and causes the meter M to provide a visual indication which is representative of any fluctuations within the frequency band 0.05 Hz to 5.0 Hz. The output signal developed at the Meter M of the agitation monitor 15 is passed by way of amplifiers (not shown) to an agitation recorder 17 which produces a trace 18 as shown in FIG. 3 indicative of the agitation of the molten contents of the vessel 1.

In carrying out the steelmaking process the output of the scaling amplifier 12 is adjusted so that it reads zero as indicated at point 19 on trace 14, and oxygen is then injected into the molten charge by lance 17. Fluxes are then introduced into the vessel 1, causing the recorded weight to increase towards a value indicated at point 22. The injection of the oxygen causes carbon to be removed from the molten charge and leave the vessel 1 as either carbon monoxide or carbon dioxide which tends to reduce the recorded weight, while silicon and then manganese and phosphorus are removed from the molten charge and appear in the slag, mainly as oxides, which tend to increase the recorded weight. During this time there may be periods when the recorded weight of the furnace contents tends to remain substantially constant as indicated by the portion of trace 14 between the points 20 and 21. Subsequently, a small amount of carbon is oxidised and iron oxides build up in the slag so that the recorded weight again begins to increase towards a value indicated at the point 22 on the trace 14. Finally, there is a secondary decarburization of the molten charge which brings down the carbon level to the finishing level and progressively reduces the recorded weight as indicated by the portion of the trace 14 between points 22 and 23.

During this period of secondary decarburization the change of weight trace 14 tends to fluctuate rapidly as indicated by the peaks 24 and troughs 25, and it has been found that these fluctuations are indicative of the level of agitation of the liquid contents of the vessel 1 and are also indicative of the physical and/or chemical changes which are taking place at this time. Therefore, by extracting that part of the output signal of the scaling amplifier 12 which produces the fluctuation and applying it to the recorder 17, a trace 18 as shown in FIG. 3 is obtained which is representative of the agitation in the liquid contents of the vessel 1. For the fluctuations shown in the trace 14 it was found that the part of the output signal of the scaling amplifier 12 which was indicative of the level of agitation was a frequency band within the range 0.1 Hz to 1.0 Hz.

The trace 18 produced by the recorder 17 is used in the following manner to control the activity of the molten metal in the vessel 1. When oxygen is first injected into the molten charge, the tip of the lance 7 is positioned about 100 inches above the surface of the molten charge. Typically, with a molten charge of 150 tons, oxygen is injected into the molten charge at a substantially constant rate of 10,000 cubic feet per minute. After a period of one minute the tip of the lance 7 is gradually lowered to a height of 75 inches above the surface of the molten charge, and four minutes later the tip of the lance 7 is brought to a height of 50 inches above the surface of the molten charge. Finally, after a further two minutes the tip of the lance 7 is brought to a height of 39 inches above the surface of the molten charge and remains at this height until the end of the steelmaking process. If the tip of the lance 7 is lowered too soon the slag becomes very viscous and if the lowering of the tip of the lance is delayed too long the slag becomes foamy and may slop over the sides of the vessel 1.

The time at which the tip of the lance should be lowered to its final position above the surface of the molten charge can be ascertained from the trace 14 in FIG. 2 which at this time begins to fluctuate as indicated at point 27. The time at which the fluctuations commence can be more readily ascertained from the trace 18 which has a substantially linear rise at this time. Therefore, by preparing a calibration chart which, for the vessel 1 with 150 ton molten charge and constant rate of oxygen injection as described above, consists of an idealized curve of substantially the same shape as trace 18, the point 28 on the trace 18 at which the lance 7 should be lowered to its final height can readily be ascertained. In practice the optimum position for the point 28 has been found to be midway along the linear portion of the trace 18.

When the secondary decarburization nears completion the fluctuations of the trace 14 diminish in amplitude as can be seen from the portion of the trace near to the point 23, and it is at this time that the injection of oxygen into the molten charge needs to be terminated by raising the lance 7. The optimum time for terminating the process can be more readily ascertained from the trace 18 which has a substantially linear fall at this time. In practice it has been found that the optimum time to terminate the injection of oxygen corresponds to a point 29 midway along the linear portion of the trace 18.

Although the rate of oxygen injection was kept substantially constant in the process described above, calibration charts can also be prepared to cover predetermined variations in the rate of oxygen injection during the process, provided that the predetermined variation in oxygen injection is repeated faithfully when the process is being controlled. Moreover, although the oxygen was injected by means of a lance 7 in the process described above, vessels employing bottom blowing of oxygen utilizing a valve 31 in the bottom of the vessel 1 are also suitable for carrying out the process.

It is envisaged that the method and apparatus of the invention will find use in many other industrial processes in which the treatment of a medium in a vessel produces agitation of the medium which is related to the physical and/or chemical changes taking place in the medium. In particular it is thought that the method and apparatus of the invention will find use in brewing and winemaking processes wherein the addition of yeast to a liquid medium results in fermentation accompanied by agitation of the liquid which can be monitored, recorded and used to control the progress of the process in a manner similar to that described above.

I claim:

1. Apparatus for physically or chemically or physically and chemically variably treating a substance in a vessel under conditions that make it diffcult to ascertain a physical change or a chemical change or physical and chemical changes, during which variable treatment the weight of the substance varies as a function of time and at least during a stage of such treatment the substance undergoes a period of change in agitation accompanying a change in at least a physical condition or a chemical condition or physical and chemical conditions of the substance, the onset and termination of said period of changed agitation being indicative of the beginning and the end of said stage of the treatment, said treatment desirably being altered at the beginning and at the end of said stage, said apparatus comprising:
   (a) means for monitoring the weight of the substance in the vessel during treatment as a function of time;
   (b) means for producing an electricalsignal indicative of the apparent variation in weight of the substance in the vessel which signal includes, as a factor, a variation in weight due to the agitation of the substance in the vessel as it undergoes a physical change or a chemical change or physical and chemical changes;
   (c) means for extracting from the apparent weight electrical signal that part of the signal produced by the agitation of the substance in the vessel; and
   (d) means for recording the agitation part of the signal as a function of time;
   (e) whereby said treatment of said substance may be altered at the beginning and end of said stage at the onset and at the termination of said period of change in agitation.

2. Apparatus as claimed in claim 1, wherein the weight of the contents of the vessel is monitored by a plurality of force measuring transducers.

3. Apparatus as claimed in claim 2, wherein the force measuring transducers are incorporated in pedestals supporting the vessel.

4. Apparatus as claimed in claim 2, wherein each force measuring transducer comprises a steel billet to which is bonded a foil strain gauge sensitive to tensile or compressive load, and the foil strain gauges are connected in an electrical bridge circuit arranged to produce the electrical signal indicative of the apparent variations in weight of the contents of the vessel.

5. Apparatus as claimed in claim 1, wherein the means for extracting from the electrical signal that part of the signal produced by the agitation of the medium in the vessel is responsive to a frequency band within the range 0.05 Hz to 0.5 Hz.

6. Apparatus as claimed in claim 1, wherein the means for extracting from the electrical signal that part of the signal produced by agitation of the medium in the vessel includes a monitor responsive to the said part of the signal.

7. Apparatus as claimed in claim 6, wherein the monitor is responsive to a frequency band within the range 0.1 Hz to 1.0 Hz.

8. Apparatus as claimed in claim 1, wherein the recording means is arranged to produce a trace indicative of said part of the signal.

9. Apparatus as claimed in claim 1, wherein the medium is a molten charge being treated in a steelmaking process involving the injection of oxygen, and the vessel is a refractory vessel.

10. Apparatus as claimed in claim 9, wherein the oxygen is injected by means of a lance disposed above the molten charge.

11. Apparatus as claimed in claim 9, wherein the oxygen is injected through valve means in the bottom of the vessel.

12. Apparatus for treating a molten charge in a steel making process involving the injection of oxygen, said molten charge being contained in a vessel in which the weight of the molten charge varies during treatment as a function of time and the molten charge undergoes agitation during treatment, said aparatus comprising:
   (a) means for controlling the injection of oxygen into the molten charge so as to vary the characteristics of the molten charge during treatment;
   (b) means for monitoring the weight of the molten charge in the vessel as a function of time and for producing an electrical signal indicative of the apparent variation in weight of the molten charge in the vessel, which signal includes, as a factor, a variation in weight due to agitation of the molten charge in the vessel;
   (c) means for extracting from the apparent weight electrical signal that part of the signal produced by agitation of the molten charge in the vessel;
   (d) means for recording the agitation part of the signal as a function of time;
   (e) whereby the treatment of the molten charge in the vessel can by controlled so as to vary the characteristics of the molten charge in dependence on the signal produced by the agitation.

13. Apparatus as claimed in claim 12, wherein the means for controlling the injection of oxygen includes a lance for injecting oxygen disposed above the molten charge and arranged to be raised and lowered in dependence on the signal produced by the agitation.

14. A method for physically or chemically or physically and chemically variably treating a substance in a vessel during which variable treatment the weight of the substance varies as a function of time and at at least during a stage of such treatment the substance undergoes a period of change in agitation accompanying a change in at least a physical condition or a chemical condition or physical and chemical conditions of the substance, the onset and termination of said period of changed agitation being indicative of the beginning and the end of said stage of the treatment, said treatment desirably being altered at the beginning and at the end of said stage, said method comprising:
  (a) monitoring the weight of the substance in the vessel during treatment as a function of time;
  (b) producing an electrical signal indicative of the apparent variation in weight of the substance in the vessel which signal includes, as a factor, a variation in weight due to the agitation of the substance in the vessel as it undergoes a physical change or a chemical change or physical and chemical changes;
  (c) extracting from the apparent weight electrical signal that part of the signal produced by the agitation of the substance in the vessel;
  (d) recording the agitation part of the signal as a function of time; and
  (e) altering said treatment of said substance at the beginning and end of said stage at the onset and at the termination of said period of change in agitation.

15. A method as claimed in claim 14, wherein the part of the signal produced by agitation of the medium in the vessel is a frequency band within the range 0.05 Hz to 0.5 Hz.

16. A method as claimed in claim 14, wherein the part of the signal produced by agitation of the medium in the vesel is a frequency band within the range 0.1 Hz to 1.0 Hz.

17. A method as claimed in claim 14, wherein the weight of the contents of the vessel is monitored by a plurality of force measuring transducers.

18. A method as claimed in claim 17, wherein the force measuring transducers are incorporated in pedestals supporting the vessel.

19. A method as claimed in claim 17, wherein each force measuring transducer comprises a steel billet to which is bonded a foil strain gauge sensitive to tensile or compressive load, and the foil strain gauges are connected in an electrical bridge circuit arranged to produce the electrical signal indicative of the apparent variations in weight of the contents of the vessel.

20. A method as claimed in claim 14, wherein the part of the electrical signal produced by agitation of the medium in the vessel is extracted by a monitor responsive to that part of the signal.

21. A method as claimed in claim 14, wherein the part of the signal produced by agitation of the medium in the vessel is recorded by recording means arranged to produce a trace of said part of the signal.

22. A method as claimed in claim 14, wherein the medium is a molten charge being treated in a steelmaking process involving the injection of oxygen.

23. A method as claimed in claim 22, wherein the oxygen is injected by means of a lance disposed above the molten charge.

24. A method as claimed in claim 22, wherein the oxygen is injected through valve means in the bottom of the vessel.

25. A method as claimed in claim 22, wherein the oxygen is injected at a substantially constant rate.

26. A method as claimed in claim 22, wherein the oxygen is injected at a rate which varies in a predtermined manner.

27. A method for treating a molten charge in a steelmaking process involving the injection of oxygen, said molten charge being contained in a vessel, in which the weight of the molten charge varies during treatment as a function of time and the molten charge undergoes agitation during treatment, said method comprising:
  (a) controlling the injection of oxygen in the molten charge so as to vary the characteristics of the molten charge during treatment;
  (b) monitoring the weight of the molten charge in the vessel during treatment as a function of time;
  (c) producing an electrical signal indicative of the apparent variation in weight of the molten charge in the vessel, which signal includes, as a factor, a variation in the weight due to agitation of the molten charge in the vessel;
  (d) extracting from the apparent weight electrical signal that part of the signal produced by agitation of the molten charge in the vessel;
  (e) recording the agitation part of the signal as a function of time; and
  (f) controlling the injection of oxygen into the molten charge in dependence on the signal produced by the agitation.

28. A method as claimed in claim 27, wherein the injection of oxygen is altered at the onset and at the termination of the signal produced by the agitation.

* * * * *